(12) United States Patent
Lamee

(10) Patent No.: US 8,114,196 B2
(45) Date of Patent: Feb. 14, 2012

(54) GAS TURBINE INLET FILTER HOUSE CLEANING APPARATUS AND METHOD

(75) Inventor: Ehab Lamee, Doha (QA)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 12/550,611

(22) Filed: Aug. 31, 2009

(65) Prior Publication Data

US 2011/0048236 A1 Mar. 3, 2011

(51) Int. Cl.
*B01D 46/04* (2006.01)

(52) U.S. Cl. .......................... 95/280; 55/302

(58) Field of Classification Search ............ 55/293, 55/294, 302, 379, 295, 296, 297, 298, 300, 55/303; 95/278, 279, 280; 15/304, 321, 15/352; 210/391, 393, 394

See application file for complete search history.

(56) References Cited

U.S. PATENT DOCUMENTS

| | | | | |
|---|---|---|---|---|
| 4,280,826 A * | 7/1981 | Johnson, Jr. | | 55/302 |
| 5,549,734 A | 8/1996 | Standard | | |
| 5,565,012 A * | 10/1996 | Buodd | | 55/294 |
| 5,584,900 A * | 12/1996 | Zaiser et al. | | 55/293 |
| 6,875,256 B2 | 4/2005 | Gillingham | | |
| 7,815,701 B2 * | 10/2010 | Grieve | | 55/294 |
| 2005/0252178 A1* | 11/2005 | Richard | | 55/302 |
| 2009/0107337 A1 | 4/2009 | Vu | | |

OTHER PUBLICATIONS

Search Report issued in connection with GB Application No. 1014247.9, Nov. 12, 2010.

* cited by examiner

*Primary Examiner* — Duane Smith
*Assistant Examiner* — Minh-Chau Pham
(74) *Attorney, Agent, or Firm* — Nixon & Vanderhye, P.C.

(57) ABSTRACT

A pulse cleaning system for one or more hollow filter elements having an inlet and an outlet includes an air supply manifold adapted to extend across the outlet of the filter element, a conduit extending substantially perpendicular to the manifold and adapted to extend into the filter element, the conduit formed or provided with a plurality of air-emitter holes along its length dimension, and further provided with a pulse air nozzle fitted onto a remote tip of the conduit.

17 Claims, 4 Drawing Sheets

GAS TURBINE INLET FILTER HOUSE CLEANING APPARATUS AND METHOD

BACKGROUND OF THE INVENTION

The invention relates generally to automatic pulse cleaning systems for gas turbine inlet filter house elements.

To provide a safe and efficient operation, air entering a gas turbine for power generation applications is filtered. The gas turbine air inlet system may include an inlet filter house and associated ducting. The main ambient air inlet leads to a reduced outlet connected to a gas turbine inlet. Heating air is introduced via a manifold located in the inlet duct, downstream of one or more conventional silencers and the gas turbine inlet. Hot air is bled from the gas turbine compressor and carried via a conduit to the manifold, controlled by a pressure reducing valve. The hot air bled from the gas turbine compressor may also be mixed with ambient air.

Inlet filter houses are employed to filter out undesirable particulates from the inlet air before it reaches the turbine. See, for example, U.S. Pat. No. 6,875,256 and U.S. Published Application No. 2009/0107337 A1. In a typical installation, there may be between about 300 and about 800 filter elements attached to and projecting from a tube sheet, depending on the frame size of the turbine.

Systems are also provided for periodically and automatically cleaning these filter elements, typically in a programmed sequence that avoids downtime. Such systems are particularly critical in certain geographic areas that are both humid and dusty, where mud-like deposits can build up on the exterior of the filter elements. In some known pulse-cleaning systems, air supply pipes or manifolds extend across the tube sheet, with conical air pulse emitters or nozzles inserted in apertures in the pipes at each filter element outlet. The nozzle is centered on the filter element outlet and is designed to direct pulses of cleaning air into the filter element (counter to the normal flow of inlet air through the filter element) to thereby dislodge any solid particulates built up on the exterior of the element. Such arrangements are not particularly effective, however, when the filter elements are configured to have differing shapes in the axial direction. For example, one commonly used filter element has a cylindrical section at its inlet end, remote from the tube sheet, and a conical section at its outlet end where it is joined to the tube sheet. The air flow pattern of the pulse-cleaning air emitted from the single conical emitter or nozzle at the filter element outlet does not effectively clean both sections of this type of filter element.

There remains a need for a pulse-cleaning system that is especially suited for multi-section inlet filters of different shapes commonly used in gas turbine inlet filter houses.

BRIEF DESCRIPTION OF THE INVENTION

According to one exemplary but nonlimiting embodiment of the invention, there is provided a pulse cleaning system for one or more hollow filter elements having an inlet and an outlet, the pulse cleaning system comprising an air supply manifold adapted to extend across the outlet of the filter element, a conduit extending substantially perpendicular to the manifold and adapted to extend into the filter element, the conduit provided with a plurality of air emitter holes along its length dimension, and a pulse air nozzle fitted onto a remote tip thereof.

In another exemplary but nonlimiting aspect, aspect, the invention relates to a gas turbine inlet filter house comprising a housing having an inlet side and an outlet side, a tube sheet forming a wall on the outlet side, the tube sheet supporting a plurality of hollow filter elements extending into the housing, each of the plurality of hollow filter elements having an inlet and an outlet; a cleaning air supply manifold extending along the tube sheet, with a branch tube extending substantially perpendicularly from the manifold into each of the hollow filter elements, the branch tube provided with a plurality of air emitter holes along its length dimension including at a remote tip thereof.

In still another exemplary but nonlimiting aspect, the invention relates to a method of effective and precise cleaning a full portion of a filter element in a gas turbine inlet filter house comprising: (a) supplying air under pressure through an air supply manifold adjacent an outlet end of the filter element; and (b) emitting the air under pressure from the manifold at various axially spaced locations within the filter element.

The invention will now be described in connection with the drawings identified below.

DETAILED DESCRIPTION OF THE INVENTION

Figure 1:
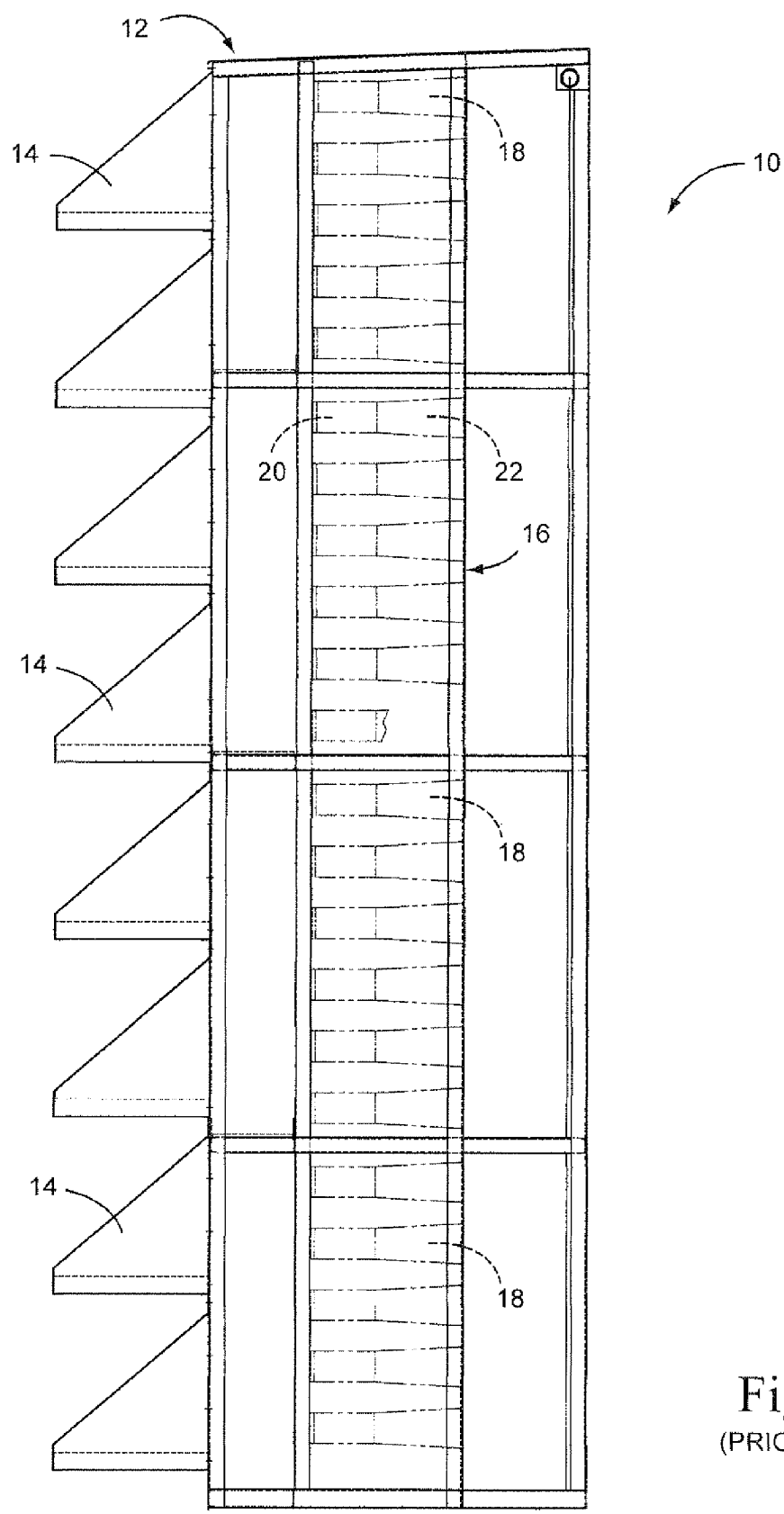
FIG. 1 is a simplified side elevation of a known gas turbine inlet filter house.
Figure 2:
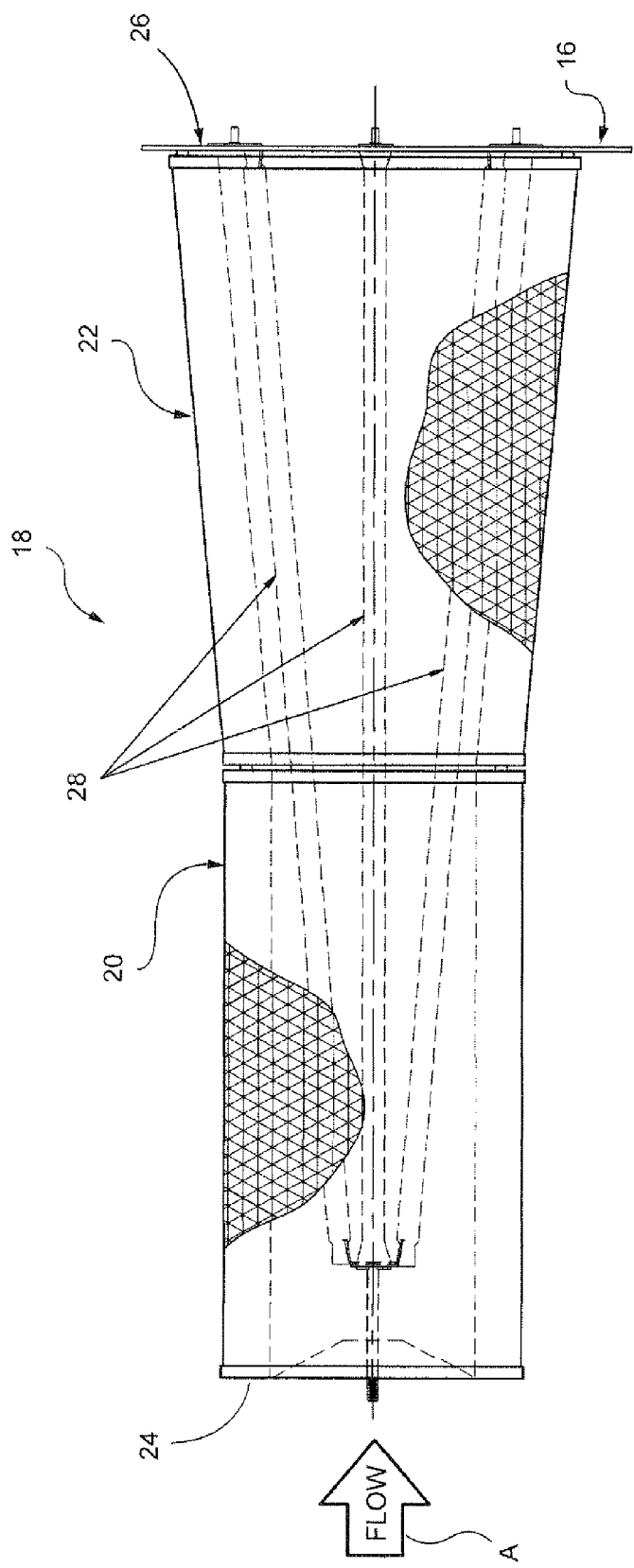
FIG. 2 is a side elevation, partly cut away, showing a known filter element used in the inlet filter house shown in FIG. 1.

Referring to FIGS. 1 and 2, a typical gas turbine inlet filter house 10 includes a housing 12 having an inlet side provided with a plurality of inlet hoods 14. The housing 12 has an outlet side that includes a tube sheet 16 which supports a plurality (usually hundreds) of cartridge-type, hollow filter elements 18 projecting into the housing 12 in cantilevered fashion. Each filter element 18 (best seen in FIG. 2) is formed with a generally cylindrical section 20 and a conical section 22. The free end of the cylindrical section 20 serves as the filter element inlet 24, while the enlarged end of the conical section 22 serves as the filter element outlet 26 which is connected to the tube sheet 16 by any suitable means. An internal tripod structure 28 may be employed to support and reinforce the filter element. In normal operation, inlet air to the turbine flows into the inlet filter house 10 via the inlet hoods 14, and through the plural filter elements 18 in the direction of flow indicated by arrow A.

Figure 3:
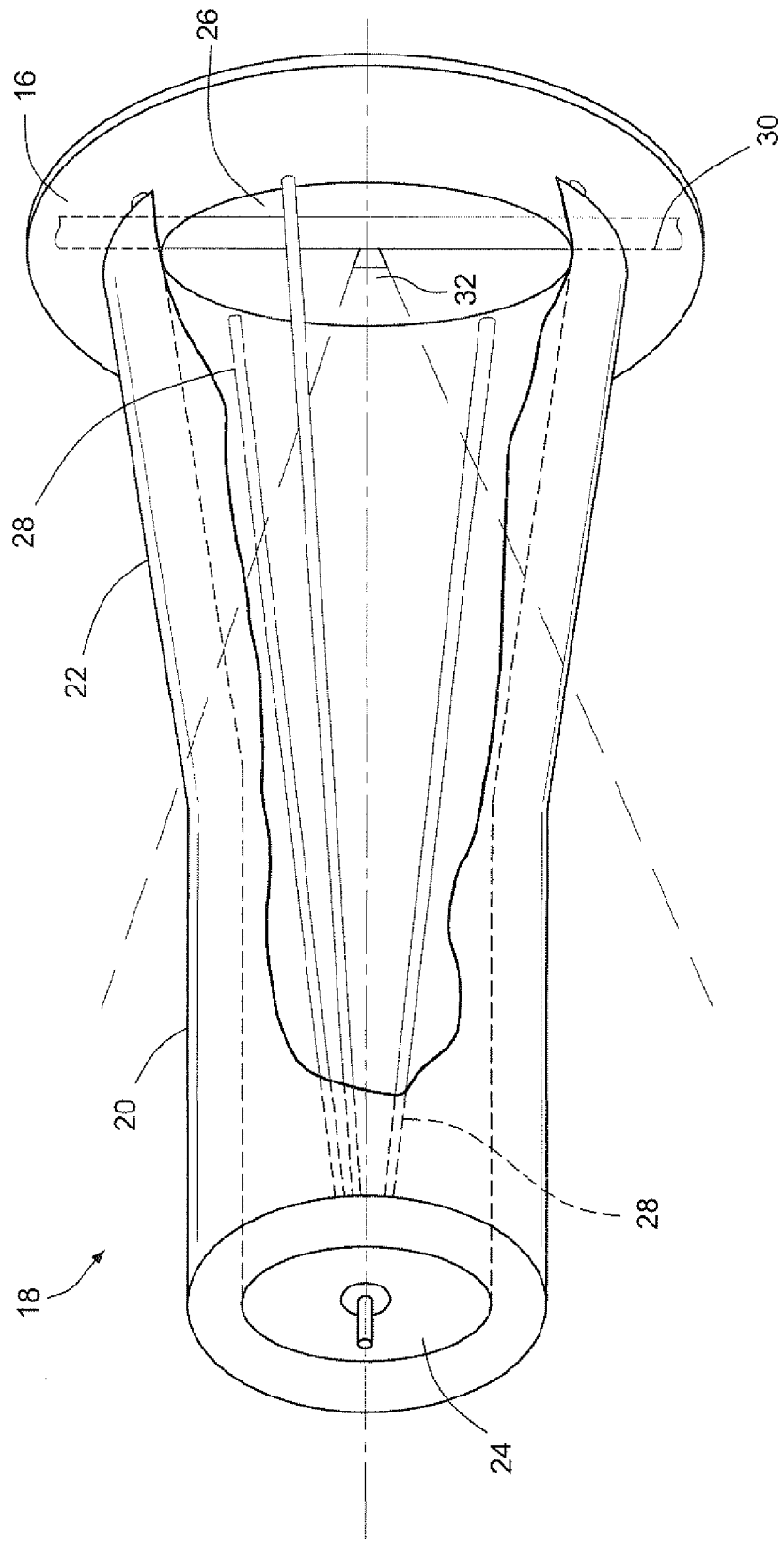
FIG. 3 is a partial perspective view of an inlet filter generally as shown in FIG. 2, but also showing a known pulse cleaning arrangement for the filter.

FIG. 3 partially illustrates a known pulse cleaning system where a cleaning air supply manifold or pipe 30 extends alongside of the tube sheet 16 opposite the side from which the filter elements 18 project, and across the filter element outlet 26. For each filter element 18, a conically-shaped pulse emitter or nozzle 32 is fitted in an aperture formed in the manifold 30 and is generally centered within the filter element outlet 26. The pulse emitter or nozzle is thus located to emit high-pressure pulses (e.g. at about 100 psi) of cleaning air into the filter element 18 in a generally conical flow pattern that is counter to the conical shape of the section 22 of the filter element. As a result, this arrangement is not particularly effective in cleaning solids adhered to the outside of the conical section 22 of the filter element nearer the tube sheet 16 and at the remote end of the cylindrical section 20.

Figure 4:
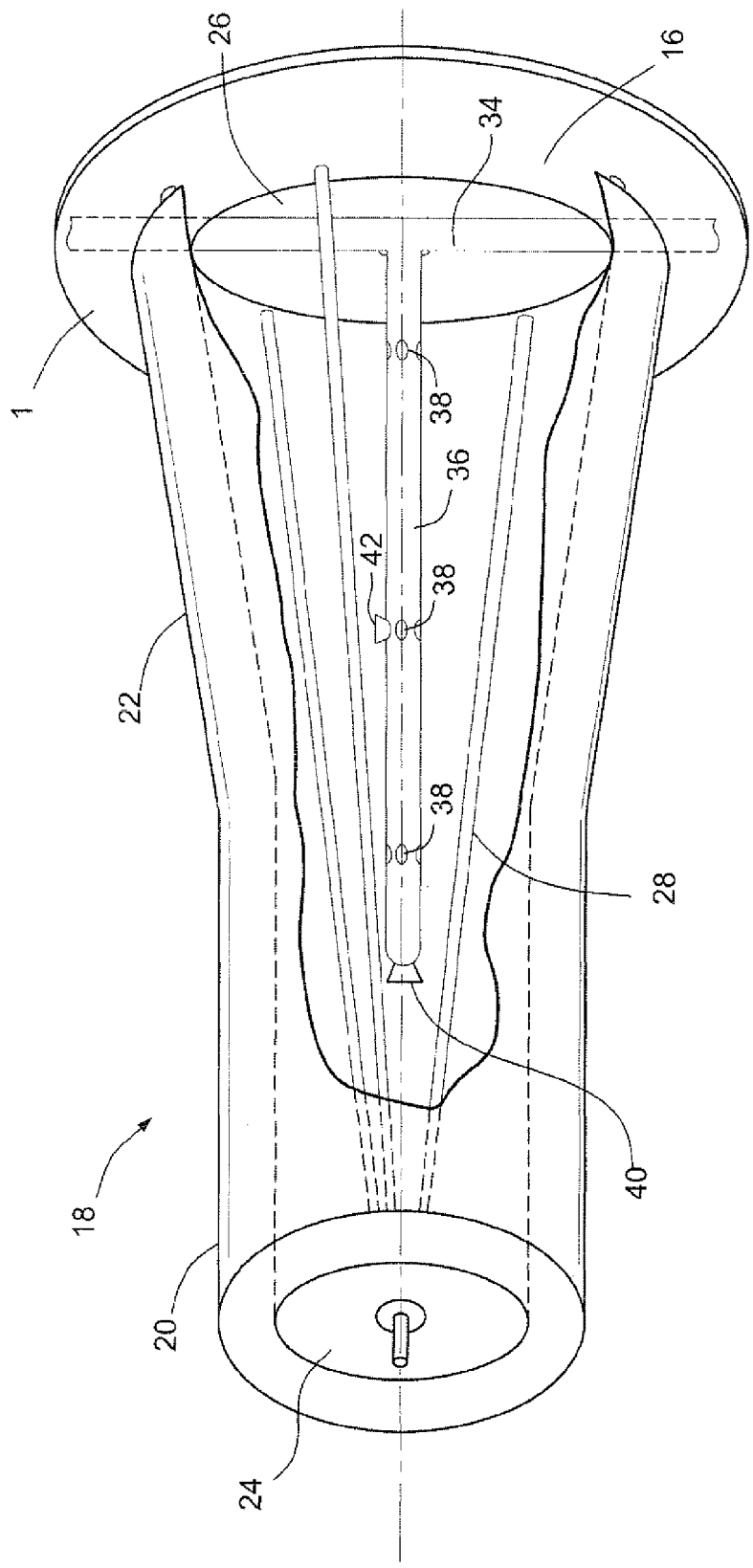
FIG. 4 is a view similar to FIG. 3 but showing a pulse cleaning arrangement in accordance with an exemplary but nonlimiting embodiment of the invention.

FIG. 4 shows a pulse cleaning apparatus in accordance with an exemplary but nonlimiting embodiment of the present invention. The filter element 18 is identical to that illustrated in FIG. 3, and its orientation relative to the tube sheet 16 remains as previously described. A new air supply manifold 34 extends across the filter element outlet 26 and a branch tube 36 (or other suitable conduit or equivalent thereof which may be flexible or rigid, and of various suitable materials, or any other equivalent means for supply of air well into the tube sections) extends from an aperture in the air supply manifold 34 (where, previously, a nozzle such as the nozzle 32 was secured), substantially perpendicular to the manifold. The branch tube 36 extends into the filter element 18 a distance at least equal to the length of the conical section 22, and into the cylindrical section 20 (preferably as far as permitted by the tripod structure 28). Along substantially the entire the length of the branch tube 36, there are plural air emitter holes 38 arranged to supply cleaning air pulses to the interior of both sections 20, 22 of the filter element 18. In addition, an emitter element or nozzle 40, which may have a size and shape similar to the nozzle 32 mentioned above, may be fitted onto the remote tip of the branch tube 36 to supply additional cleaning pulses into the remote end of the cylindrical section 20 of the inlet filter element 18.

The emitter air holes 38 may be arranged as desired, but one effective arrangement locates the holes in axially-spaced groups of 4. For example, the groups may be spaced 2 inches apart, and each hole may have a diameter of about ½ inch. In each group, the holes are spaced about 90° apart in the circumferential direction. Each hole 38 may be fitted with a nozzle 42 similar to, but smaller than, the nozzles 32, 40, but also designed to deliver pulses of cleaning air in an expanding, circular pattern. Thus, the axially spaced pattern of nozzles 42 (one shown in FIG. 4) effectively clean the conical section 22 and an adjacent portion of the cylindrical section 20 of the filter element, while the nozzle 40 located at the tip of the branch tube 36 effectively cleans the remaining remote portion of the cylindrical section 20. In addition, the above-described arrangement permits system pressure to be reduced from about 100 psi to about 40-50 psi or as requested by engineering.

It will be understood that the above described arrangement is replicated in each of the filter elements 18 attached to the tube sheet 16. Moreover, the present invention can be implemented without having to remove the extensive and complex array of manifold tubes used to clean the filter elements. In other words, the same manifold tubes may be used, and simply modified by replacing each nozzle 32 with a branch tube 36 fitted with its own array of nozzles 40, 42 as described above.

It will be further understood that the present invention is not limited to the inlet filter house construction described herein. Nor is it limited to use with any specific filter element. Moreover, the exact location and orientation of the manifold may be varied as desired, and the number, sizes shape, location, spacing and arrangement of the air pulse cleaning holes 38 may be varied within the scope of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pulse cleaning system for one or more hollow filter elements having an inlet and an outlet, the pulse cleaning system comprising an air supply manifold adapted to extend across the outlet of a filter element, a conduit extending substantially perpendicular to the manifold and adapted to extend into the filter element, said conduit provided with a plurality of air-emitter holes along its length dimension, and a conically-shaped pulse air nozzle fitted onto a remote tip of said conduit, and adapted to deliver pulses of cleaning air in an expanding circular pattern.

2. The pulse cleaning system according to claim 1 wherein said plurality of air-emitter holes are arranged in axially-spaced groups.

3. The pulse cleaning system of claim 2 wherein each of said axially-spaced groups comprises 4 of said plurality of air-emitter holes circumferentially spaced about said conduit.

4. The pulse cleaning system of claim 1 wherein said plurality of air-emitter holes along said length dimension are each fitted with a nozzle configured to deliver pulses of cleaning air in an expanding circular pattern.

5. The pulse cleaning system of claim 3 wherein each of said 4 holes of said axially-spaced groups is fitted with a nozzle configured to deliver pulses of cleaning air in an expanding circular pattern.

6. The pulse cleaning system of claim 1 wherein said plurality of air-emitter holes along said length dimension are each fitted with a nozzle configured to deliver pulses of cleaning air in an expanding circular pattern.

7. A gas turbine inlet filter house comprising a housing having an inlet side and an outlet side, a tube sheet forming a wall on said outlet side, said tube sheet supporting a plurality of hollow filter elements extending into said housing, each of said plurality of hollow filter elements having an inlet and an outlet; a cleaning air supply manifold extending along said tube sheet, with a branch tube extending from said manifold into each of said plurality of hollow filter elements, said branch tube provided with a plurality of air-emitter holes along its length dimension; and wherein a pulse air nozzle is fitted onto a tip of the branch discharge tube, said pulse air nozzle configured to deliver pulses of cleaning air in an expanding circular pattern.

8. The gas turbine inlet filter house according to claim 7 wherein said plurality of air-emitter holes in said branch tube are arranged in axially-spaced groups.

9. The gas turbine inlet filter house according to claim 8 wherein each of said axially-spaced groups comprises 4 air-emitter holes circumferentially spaced about said branch tube.

10. The gas turbine inlet filter house of claim 7 wherein said plurality of filter elements each includes a cylindrical section nearer said inlet and a conical section nearer said outlet, and wherein said branch tube extends from said outlet at least into a portion of said cylindrical section.

11. The gas turbine inlet filter house of claim 7 wherein said plurality of air-emitter holes along said length dimension are each fitted with a nozzle configured to deliver pulses of cleaning air in an expanding circular pattern.

12. A method of cleaning a filter element wherein the filter element is formed with a cylindrical section remote from an outlet of the filter element and a conical section adjacent said outlet comprising:

(a) supplying air under pressure through an air supply manifold adjacent an outlet end of the filter element; and (b) emitting the air under pressure from a branch tube connected to said manifold, said branch tube extending at least into a portion of said cylindrical section.

13. The method of claim 12 wherein step (b) includes: emitting pulses of air from axially-spaced locations along the length of said branch tube and from a tip of said branch tube into interior portions of said filter element.

14. The method according to claim 12 wherein step (b) includes emitting said pulses of air under pressure from a pulse air nozzle at said tip into a remainder of said cylindrical section.

15. The method of claim 14 wherein step (b) further includes emitting pulse air from axially-spaced groups of air-emitter holes in said branch tube at least in said conical section.

16. The method of claim 15 wherein step (b) includes emitting pulse air from nozzles located in said axially-spaced groups of air-emitter holes.

17. The method of claim 12 wherein step (b) is carried out by supplying the air at a pressure of between 40-50 psi.

* * * * *

UNITED STATES PATENT AND TRADEMARK OFFICE
CERTIFICATE OF CORRECTION

| | |
|---|---|
| PATENT NO. | : 8,114,196 B2 |
| APPLICATION NO. | : 12/550611 |
| DATED | : February 14, 2012 |
| INVENTOR(S) | : Ehab Lamee |

It is certified that error appears in the above-identified patent and that said Letters Patent is hereby corrected as shown below:

Column 3 line 58, delete "sizes shape" and insert --size, shape--

Signed and Sealed this
Seventeenth Day of April, 2012

David J. Kappos
*Director of the United States Patent and Trademark Office*